(12) United States Patent
Anhalt

(10) Patent No.: US 7,866,813 B2
(45) Date of Patent: Jan. 11, 2011

(54) EYEGLASS HOLDERS FOR HATS AND VISORS

(76) Inventor: Mark Anhalt, 1780 Kettner Blvd., #305, San Diego, CA (US) 92101

( * ) Notice: Subject to any disclaimer, the term of this patent is extended or adjusted under 35 U.S.C. 154(b) by 0 days.

(21) Appl. No.: 12/709,358

(22) Filed: Feb. 19, 2010

(65) Prior Publication Data

US 2010/0231851 A1 Sep. 16, 2010

Related U.S. Application Data

(60) Provisional application No. 61/159,611, filed on Mar. 12, 2009.

(51) Int. Cl.
G02C 3/00 (2006.01)
(52) U.S. Cl. ...................... 351/155; 2/209.13
(58) Field of Classification Search ............... 351/41, 351/155; 2/10, 209.13
See application file for complete search history.

(56) References Cited

U.S. PATENT DOCUMENTS

| | | | |
|---|---|---|---|
| 3,983,602 A | 10/1976 | Barry | |
| 4,179,753 A | 12/1979 | Aronberg et al. | |
| 5,066,154 A | 11/1991 | Renaud | |
| 5,829,103 A | 11/1998 | Allen | |
| 5,867,874 A | 2/1999 | Simpson | |
| 6,481,059 B2 | 11/2002 | Morris | |
| D478,630 S | 8/2003 | Riggins | |
| 6,618,907 B2 | 9/2003 | Morris | |
| 6,644,807 B1 * | 11/2003 | Hood | 351/155 |
| D503,430 S | 3/2005 | Chang | |
| 6,916,094 B1 | 7/2005 | Altabeb | |
| D536,735 S | 2/2007 | Johnson | |
| 7,229,172 B2 | 6/2007 | Presswood, Jr. | |
| 7,275,270 B2 | 10/2007 | Cotutsca | |
| 7,296,889 B2 | 11/2007 | Dietz | |
| 7,325,920 B1 * | 2/2008 | Gelfuso | 351/155 |

* cited by examiner

*Primary Examiner*—Huy K Mai
(74) *Attorney, Agent, or Firm*—Procopio, Cory, Hargreaves & Savitch LLP (57) ABSTRACT

A pair of eyeglass holders is designed to engage over the lower rims of respective opposite side portions of a hat, visor, or other headwear. Each eyeglass holder has a spring clip for gripping the respective hat side portion and a retainer or gripper secured to an outer leg of the spring clip. The grippers are designed to engage and releasably retain the respective arms of a pair of glasses with the glasses in an inverted orientation. Each gripper is secured to the outer leg of the associated clip to extend upwardly from a location closer to the lower end than the upper end of the clip so as to hold the respective arm of the glasses at a location relatively close to the lower rim of the hat.

21 Claims, 12 Drawing Sheets

EYEGLASS HOLDERS FOR HATS AND VISORS

RELATED APPLICATION

The present application claims priority to U.S. Provisional Pat. App. Ser. No. 61/159,611 filed Mar. 12, 2009, which is incorporated herein by reference in its entirety.

BACKGROUND

1. Field of the Invention

The present invention relates generally to eyeglass holders or retaining devices for holding the arms or ear stems of a pair of sunglasses, eyeglasses, or the like on a hat, visor or other headwear.

2. Related Art

One problem when wearing sunglasses or eyeglasses is how to hold the glasses temporarily when not needed, for example when going indoors to a store, restaurant or a darker place, or when an individual only needs to wear eyeglasses for certain activities, such as seeing at a distance, but needs to remove the glasses in order to read something at a close distance. In some cases, chains or straps are secured to the glasses so that they can be suspended around the wearer's neck when not needed, but this solution is not ideal.

U.S. Pat. No. 6,481,059 of Morris describes fasteners which are adapted to be secured on opposite sides of a hat and include structure for holding the arms of a pair of safety glasses with the front of the glasses in an upright orientation and extending across the front of the hat. The fasteners are relatively tall or long, with the arm holding structure at the upper end, in order to accommodate the height of the glasses across the front of the hat. Another eyeglass retaining device for clipping the arms of eyeglasses on opposite sides of a hat is described in U.S. Pat. No. 7,229,172 of Presswood, Jr. et al. Again, the glasses are supported in an upright orientation and the arms are gripped at a location spaced above the lower rim of the hat by a distance substantially equal to the height of the glasses.

SUMMARY

Embodiments described herein provide for eyeglass holders adapted to be secured on opposite sides of a hat or visor in order to grip the opposite arms or ear stems of a pair of glasses with the glasses in an inverted or upside down orientation.

According to one embodiment, an eyeglass holder is provided which comprises a generally U-shaped spring clip which is designed to engage over the lower rim of a hat, visor, or the like, and a retainer secured to an outer leg of the spring clip which is designed to engage and releasably retain the arm of a pair of glasses with the glasses in an inverted orientation. In practice, two eyeglass holders are used, one on each side of the hat or visor. The spring clip has a lower, closed end and an upper, open end which is engaged over the lower rim of a hat, and the retainer is secured to the outer leg of the clip at a location closer to the lower end than the upper end of the clip so as to hold an arm of the inverted pair of glasses at a location relatively close to the lower rim of the hat.

Because the eyeglass holders are designed to hold the glasses in an inverted orientation, they extend only a short distance up the outer sides of the headwear, unlike prior art eyeglass retainers for use with headwear which are relatively tall.

In one embodiment, the holder may be formed integrally in one piece, while in alternative embodiments the clip and retainer are formed separately and secured together, for example by means of adhesive or the like. In one embodiment, a sleeve of heat shrink tubing or the like may extend over the outer leg of the clip and an adjacent portion of the retainer. The retainer may be a generally U-shaped member with an inner leg secured to the clip and an outer leg, and the outer leg in one embodiment has a series of generally downwardly directed teeth which are resilient or springy and which are urged down as the arm is pushed into the retainer and spring out over the arm to releasably grip the arm of a pair of glasses when pushed down into the retainer.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for holders which support a pair of glasses in an inverted orientation on headwear such as a hat, cap, or visor.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
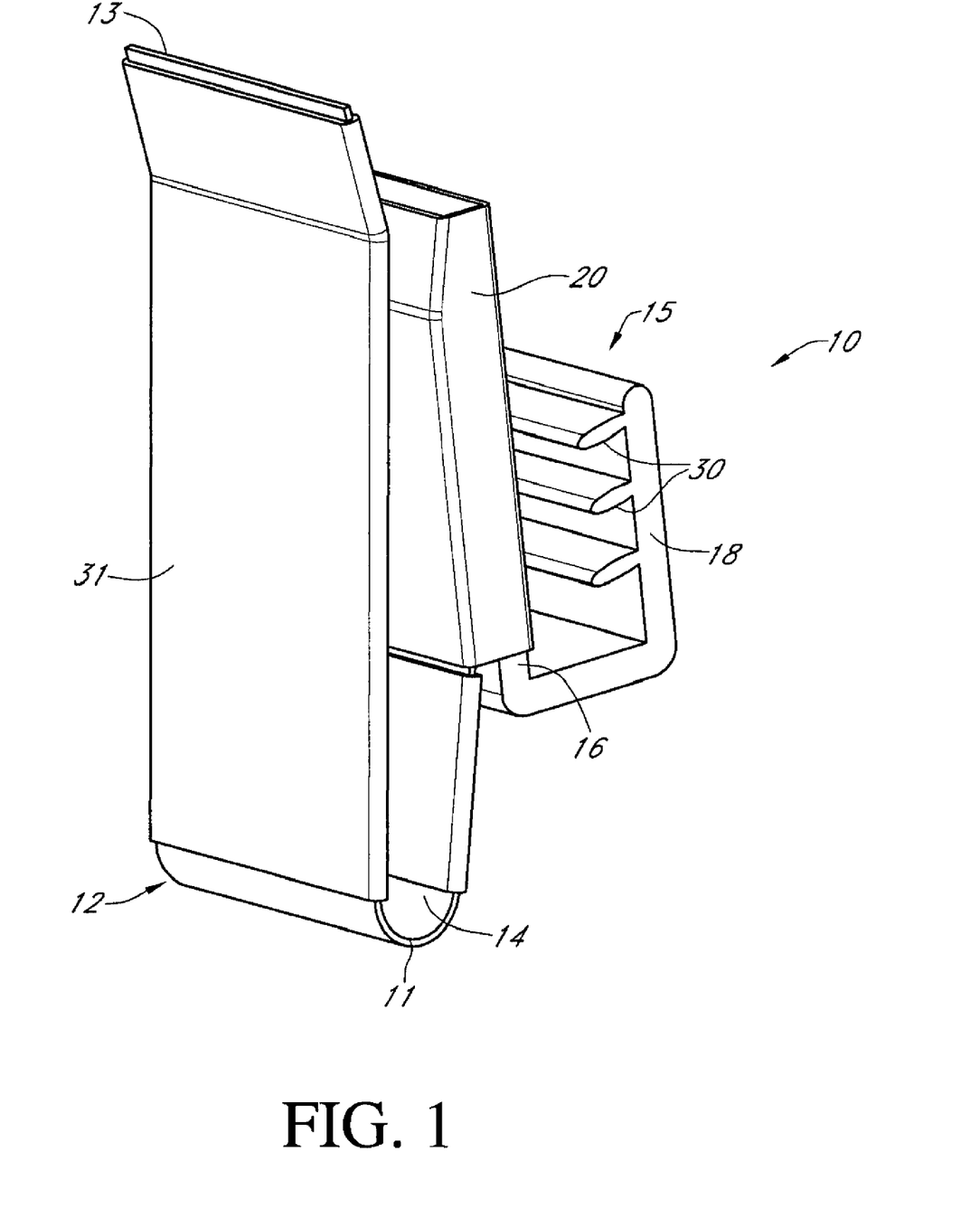
FIG. 1 is a rear perspective view of an eyeglass holder according to a first embodiment, on an enlarged scale.
Figure 2:
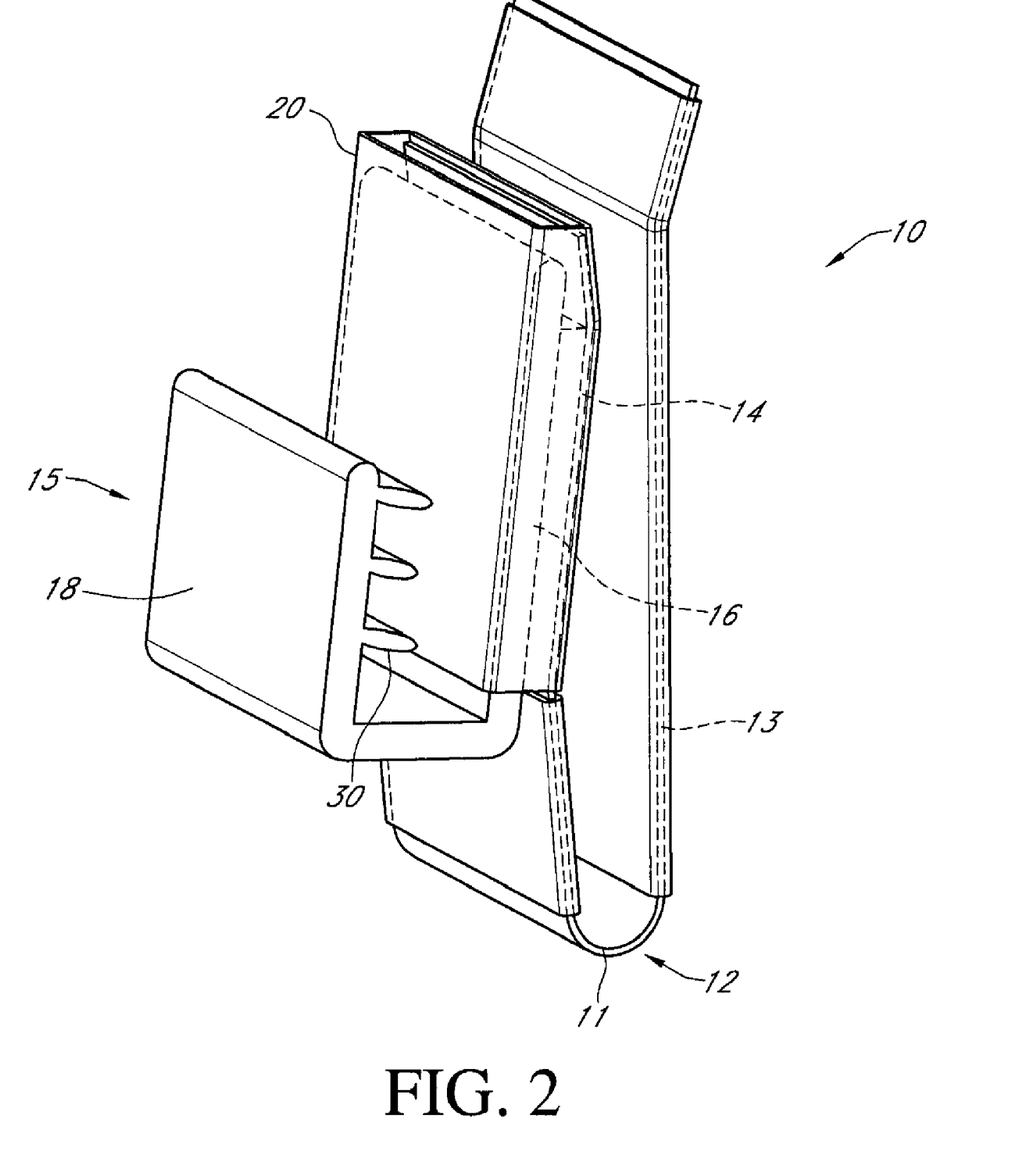
FIG. 2 is a rear perspective view of the eyeglass holder of FIG. 1.
Figure 3:
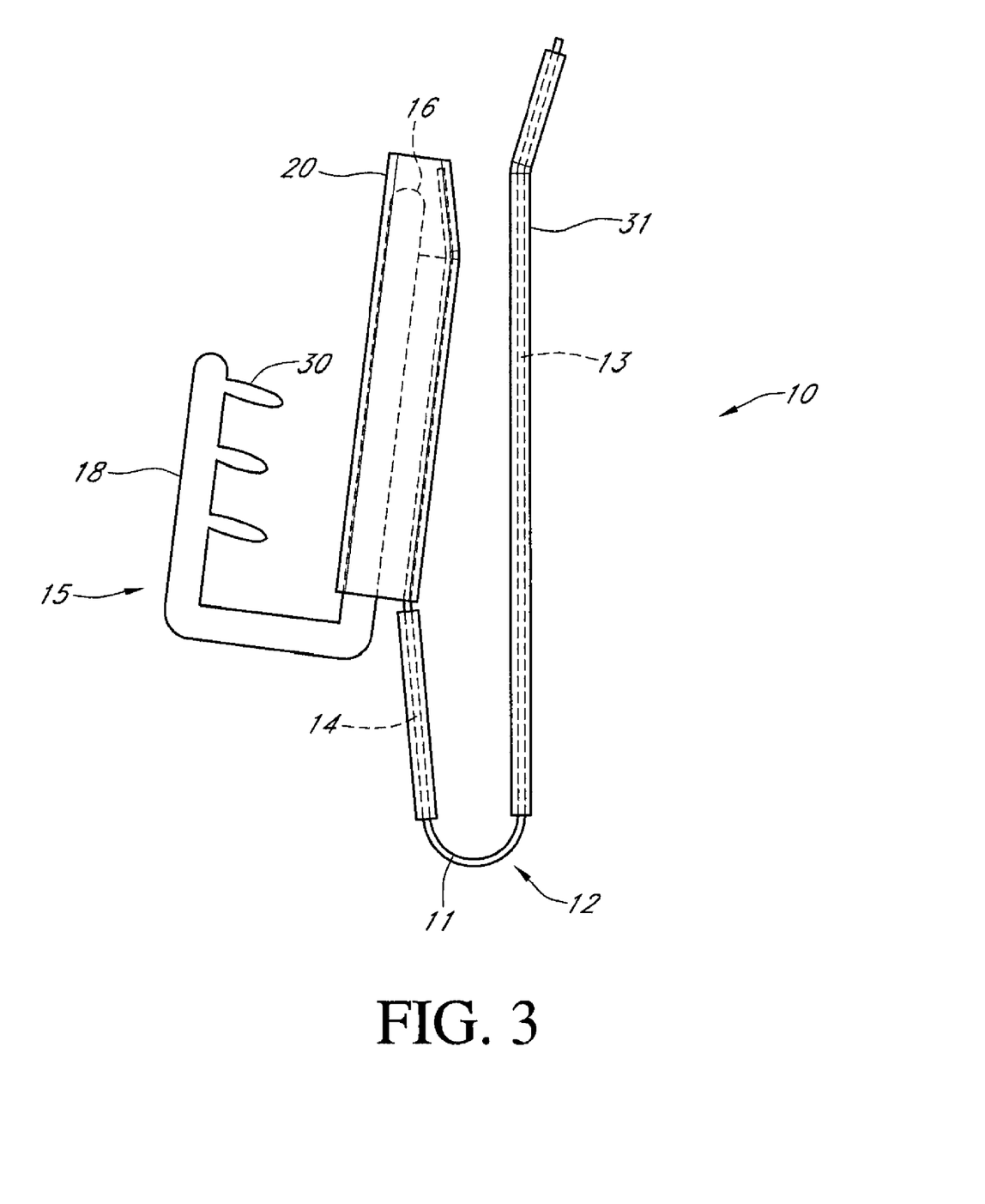
FIG. 3 is a side elevational view of the eyeglass holder of FIG. 2.
Figure 4A:
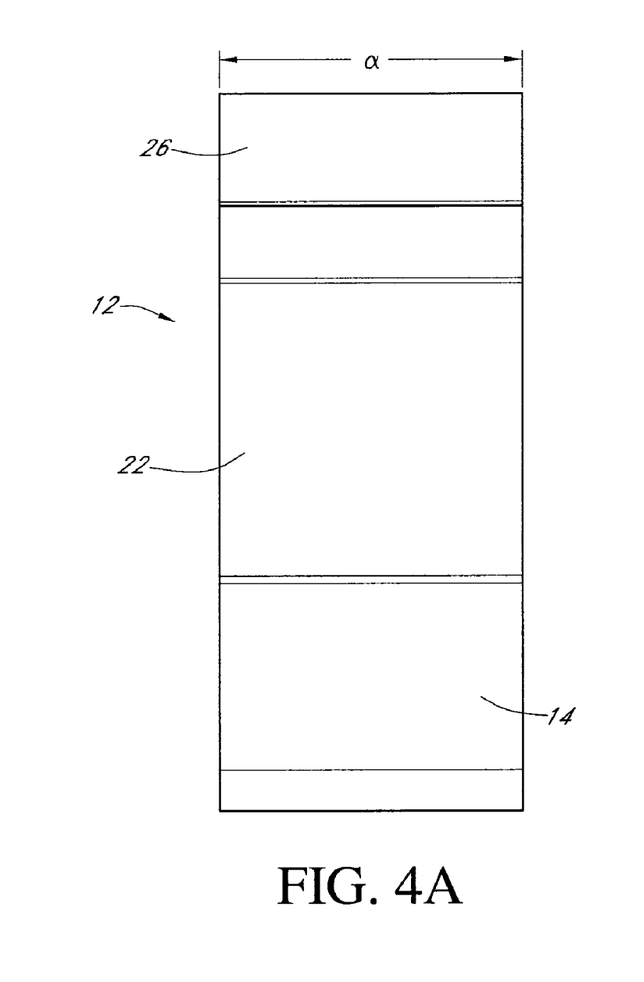
FIGS. 4A and 4B are top and side elevational views of a metal spring clip forming part of the eyeglass holder of FIGS. 1 to 3.
Figure 4B:
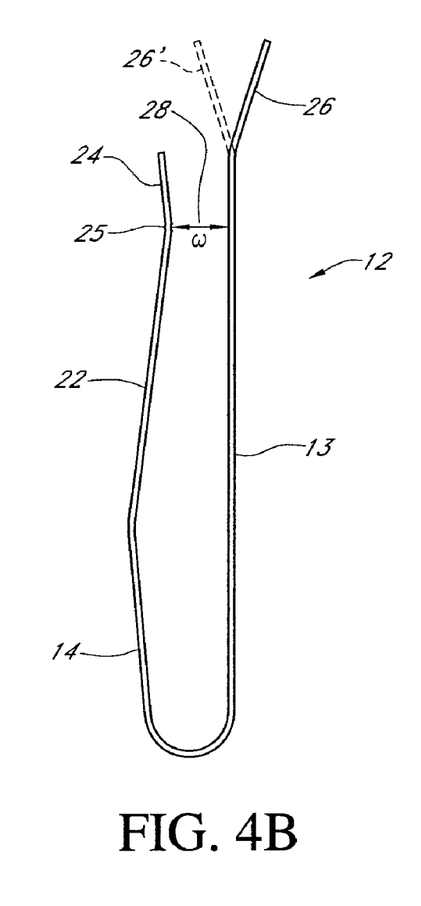

FIGS. 1 to 3 illustrate a first embodiment of a clip-on eyeglass holder 10 adapted to be attached to headwear of various types, including hats, visors, and the like, while FIGS. 4A and 4B illustrate one embodiment of a spring clip 12 forming a first part of the holder 10 of FIGS. 1 to 3, and FIGS. 5A and 5B illustrate one embodiment of a retainer 15 forming a second part of holder 10. The holder 10 comprises a first, generally U-shaped spring clip 12 for engaging over the lower edge of one side portion of a hat, visor or the like, the clip 12 having an inner leg 13, an outer leg 14, and a curved closed end portion 11 between the legs, and a second part comprising retainer or gripper 15 having an inner leg 16 secured to the outer leg of the clip 12 and a spaced outer leg 18. The retainer or gripper 15 is designed to grip and hold an arm or ear stem of a pair of glasses, as described in more detail below. In the illustrated embodiment, the first and second parts are formed separately and suitably secured together by adhesive such as double sided adhesive tape 19 (FIGS. 2 and 5A), with a sleeve 20 of heat shrink tubing or the like engaging over the adjacent legs 14, 16, but the entire holder may be formed integrally in alternative embodiments, with the outer leg 14 of the first clip and inner leg 16 of the second clip formed integrally as a single, central leg of the device.

FIGS. 4A and 4B illustrate one embodiment of the U-shaped metal spring clip 12 of holder 10. Spring clip 12 may be of any suitable metal material such as spring steel. In one embodiment, the metal clip 12 may have an outer coating of vulcanized rubber, plastic, or the like so that it is more comfortable for the hat or visor wearer and has a better grip with the fabric of the hat or visor. The rubber coating may be in different colors to match different colors of headwear. The first or inner leg 13 is longer than the outer leg 14. Outer leg 14 is tapered inwardly towards the inner leg 13 along a large portion 22 of its length, and has a short outwardly tapered lead in portion 24 at its end with an inward bend 25 between portions 22 and 24. The inner leg 13 is substantially straight along most of its length, up to the end of the outer leg, and has an outwardly tapered lead in portion 26 extending from the straight portion up to the end of leg 13. This forms an inlet 28 of reduced size between the flat portion of leg 13 and the bend 25 between the portions 22 and 24 of leg 14, which can grip the material of a hat or visor when the clip is engaged over the lower rim of the hat or visor, as seen in FIGS. 7 to 10. At the same time, the tapered lead in portions 24, 26 help to locate the clip over the lower rim of a hat on installation.

In a modified embodiment of the clip, as illustrated in dotted outline in FIG. 4B, leg 13 has an end portion 26' which is angled inwardly rather than outwardly. Since this part of the clip engages inside the cap or headwear during use, an inwardly tapered end portion can help prevent a wearer's hair from becoming caught between the leg 13 and the inner surface of the cap or visor. Other than end portion 29', the modified clip is identical to clip 12.

In one embodiment, the longer leg 13 of the metal spring clip 12 has a length of around 1¼ inches and the shorter leg 14 has a length of around 1 inch, while the width w of the inlet 28 is around ⅛ inch and the length of outwardly flared end portion 24 of leg 14 is also around ⅛ inch. The length of outwardly flared end portion 26 or 26' of clip 12 is around 3/16 to ¼ inches. The maximum width of clip 12 is around ⅛ inches, and the combined length of portions 22 and 24 of leg 14 (dimension C of FIG. 4B) is around ⅝ inches. The breadth a of each leg of the clip is around ½ inch.

As illustrated in FIGS. 2 and 3, where spring clip 12 is of uncoated metal such as spring steel, a shrink wrap plastic sleeve 31 may also extend over the inner leg 13 of the clip, for improved gripping engagement with an opposing inner surface of headwear on which the holder 10 is engaged, and also to make the clip more comfortable for the user wearing the headwear.

Figures 5A, 5B:
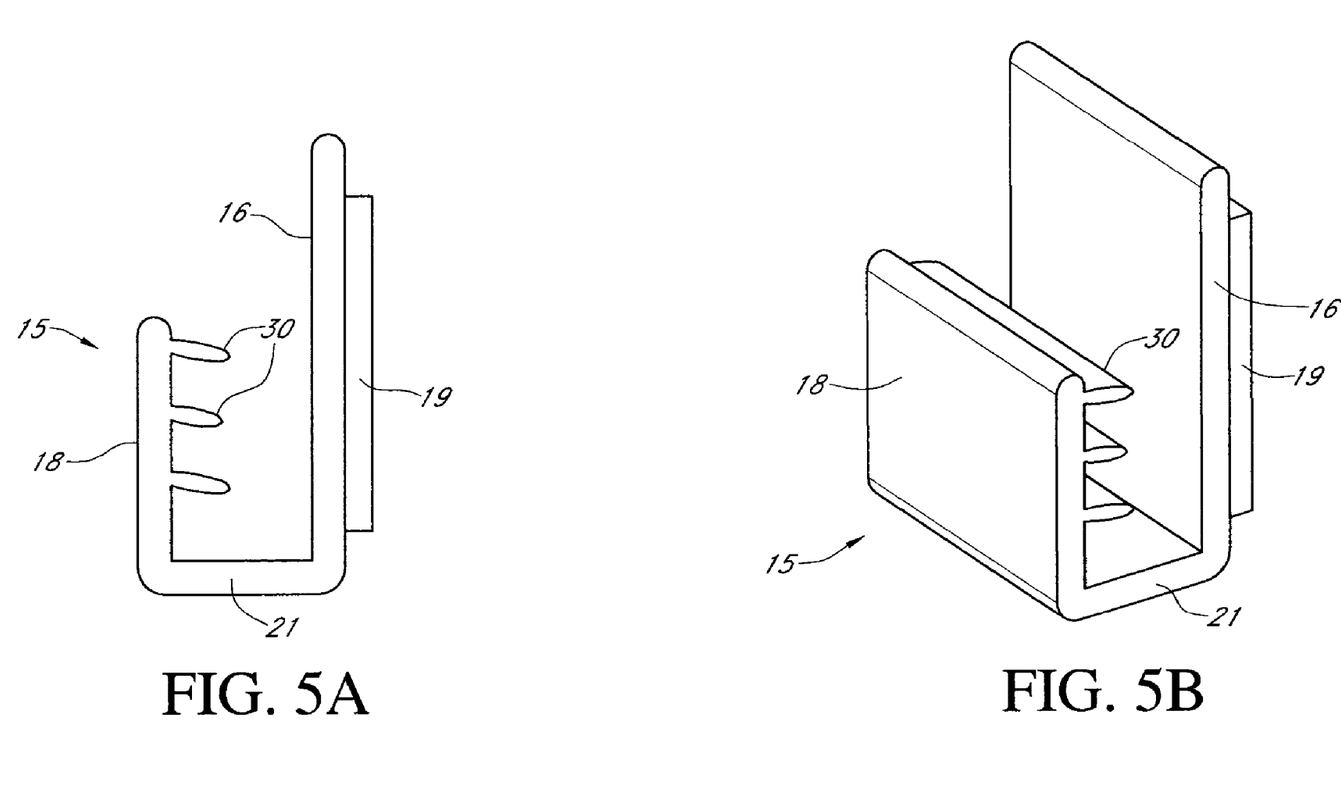
FIGS. 5A and 5B are side elevational and front perspective views, respectively, of a plastic retainer forming part of the eyeglass holder of FIGS. 1 to 3.

The gripper or retainer part 15 of the holder is illustrated separate from the first part 10 in FIGS. 5A and 5B. As best illustrated in FIG. 5A, retainer 15 is generally U shaped with the longer inner leg 16 and a shorter outer leg 18 connected by web 21 at the closed end of the retainer. Outer leg 18 has a plurality of inwardly directed teeth or fins 30 extending towards leg 16. The teeth 30 are inclined downwardly towards the lower end 21 of gripper 15, and are of resilient or pliable material. FIG. 3 illustrates the spring clip 12 with the inner leg 16 of retainer 15 secured to the tapered portion 22 of the outer leg 14. As noted above, a sleeve or length of heat shrink tubing 20 is secured over the legs 14 and 16. In one embodiment, retainer or gripper 15 is made of plastic material and the teeth 30 are downwardly directed and somewhat springy or resilient, so that they give way to allow an eyeglass arm or ear stem to enter the clip, and then spring back over the arm to help hold it in place. The teeth may be of a different, more resilient material than the remainder of the gripper 15 and may be suitably bonded or adhered to the inner face of leg 16. In one embodiment, a plastic sign holder such as the Gripper Flush Sign Holder sold by K International Inc. of Gurnee, Ill. was used for the retainer 15. In one example, the retainer 15 was made from PVC and had a length of around 0.5 inches and a height of around ¾ inches.

Figure 6A:
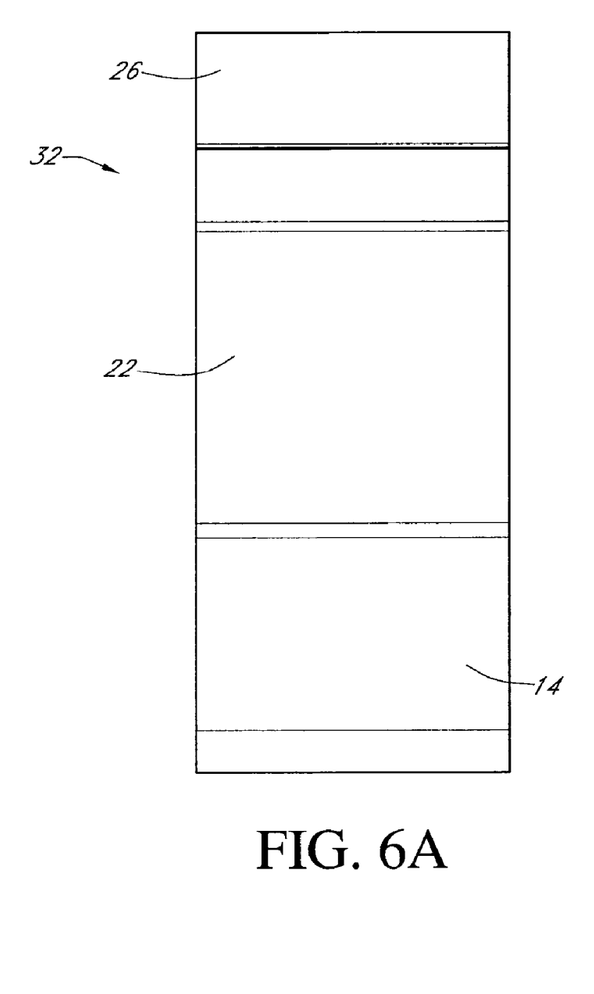
FIGS. 6A and 6B are top and side elevational views of a plastic spring clip forming part of a modified eyeglass holder.
Figure 6B:
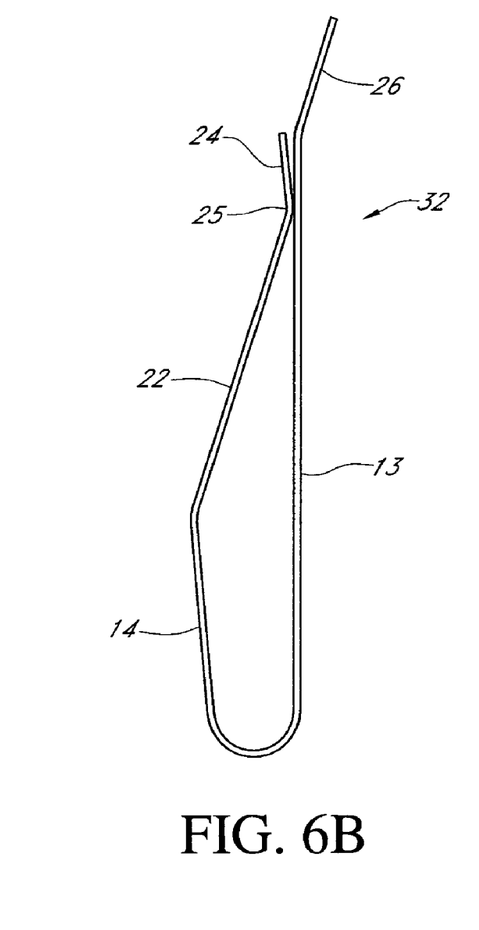
Figure 7:
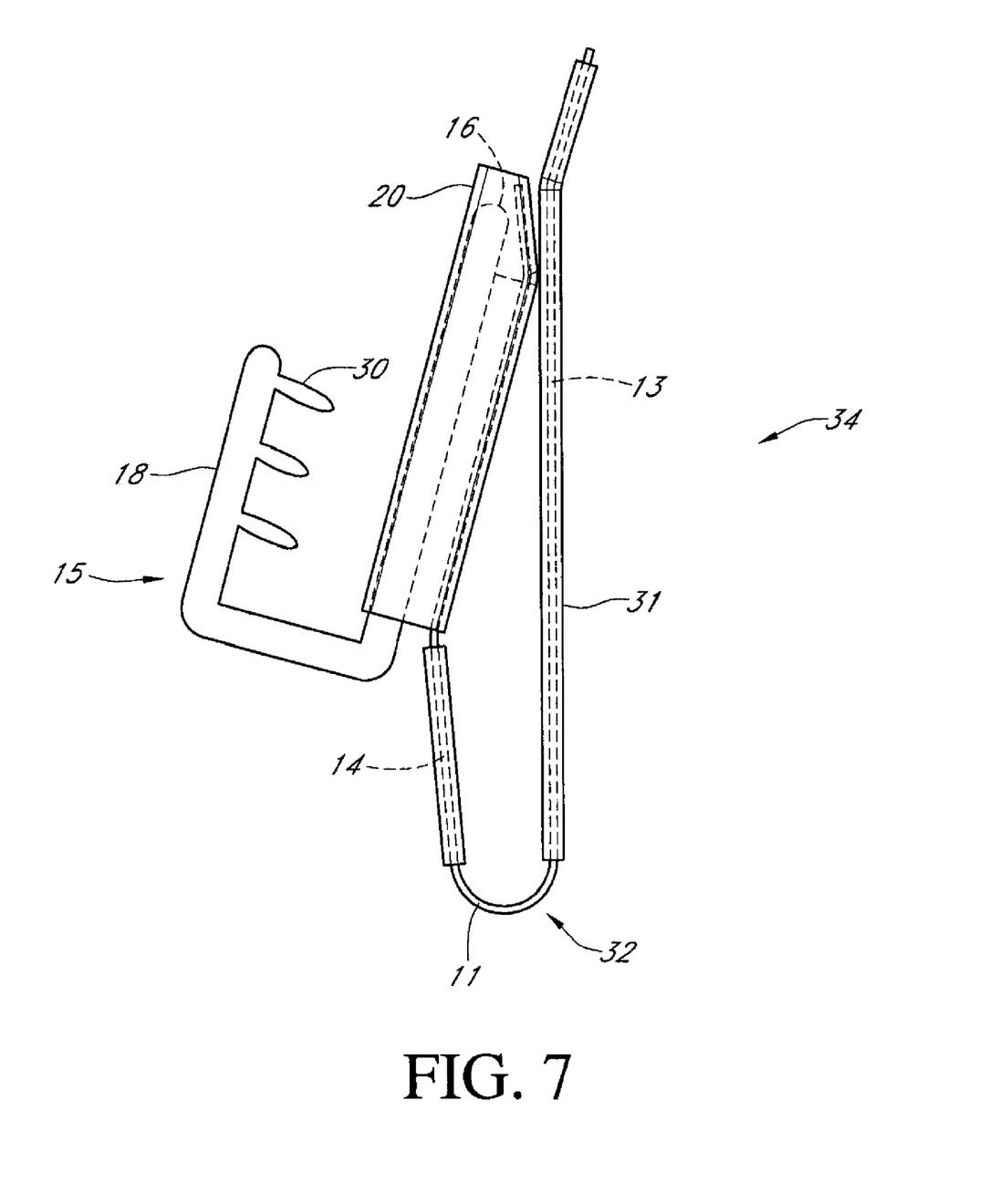
FIG. 7 is a side elevational view of a second embodiment of an eyeglass holder including the plastic clip of FIGS. 6A and 6B.

FIGS. 6A and 6B illustrate a modified spring clip 32 of plastic material which may be used in an eyeglass holder 34 according to a second embodiment, as illustrated in FIG. 7. Eyeglass holder 34 is otherwise identical to the first embodiment, and like reference numbers are used for like parts as appropriate. Plastic spring clip 32 is of similar shape and dimensions to the metal spring clip, except that the inlet gap 28 between bend 25 and the opposing inner leg 13 is eliminated, and instead the bend 25 engages the opposing surface of leg 13 when the device is not in use, as seen in FIG. 5B. Gap 28 is eliminated in this embodiment because the plastic clip has less resilience than a springy metal clip. The hat material is forced between the opposing bend 25 and leg 13 when the holder is engaged over the lower rim of a hat, so that the clip grips the material and is held firmly in place. The thickness of the plastic material forming clip 32 may be of the order of 0.04 inches. The end portion 26 of longer leg 13 may be angled inwardly rather than outwardly as illustrated in dotted outline for metal clip 12 in FIG. 4B, or may be straight, to reduce the risk of a wearer's hair becoming tangled or trapped in the clip.

FIG. 7 illustrates the eyeglass holder 34 incorporating plastic spring clip 32. As in the previous embodiment, a gripper or retainer 15 is secured to the inclined portion 22 of the outer leg of clip 32 in any suitable manner, such as by adhesive, bonding, or the like, and a sleeve 20 of shrink tubing is engaged over the legs 14 and 16. In alternative embodiment, the entire eyeglass holder may be made integrally as a one-piece unit, with the legs 14, 16 of the separate parts in the previous embodiments replaced with a single, central leg.

Figure 8:
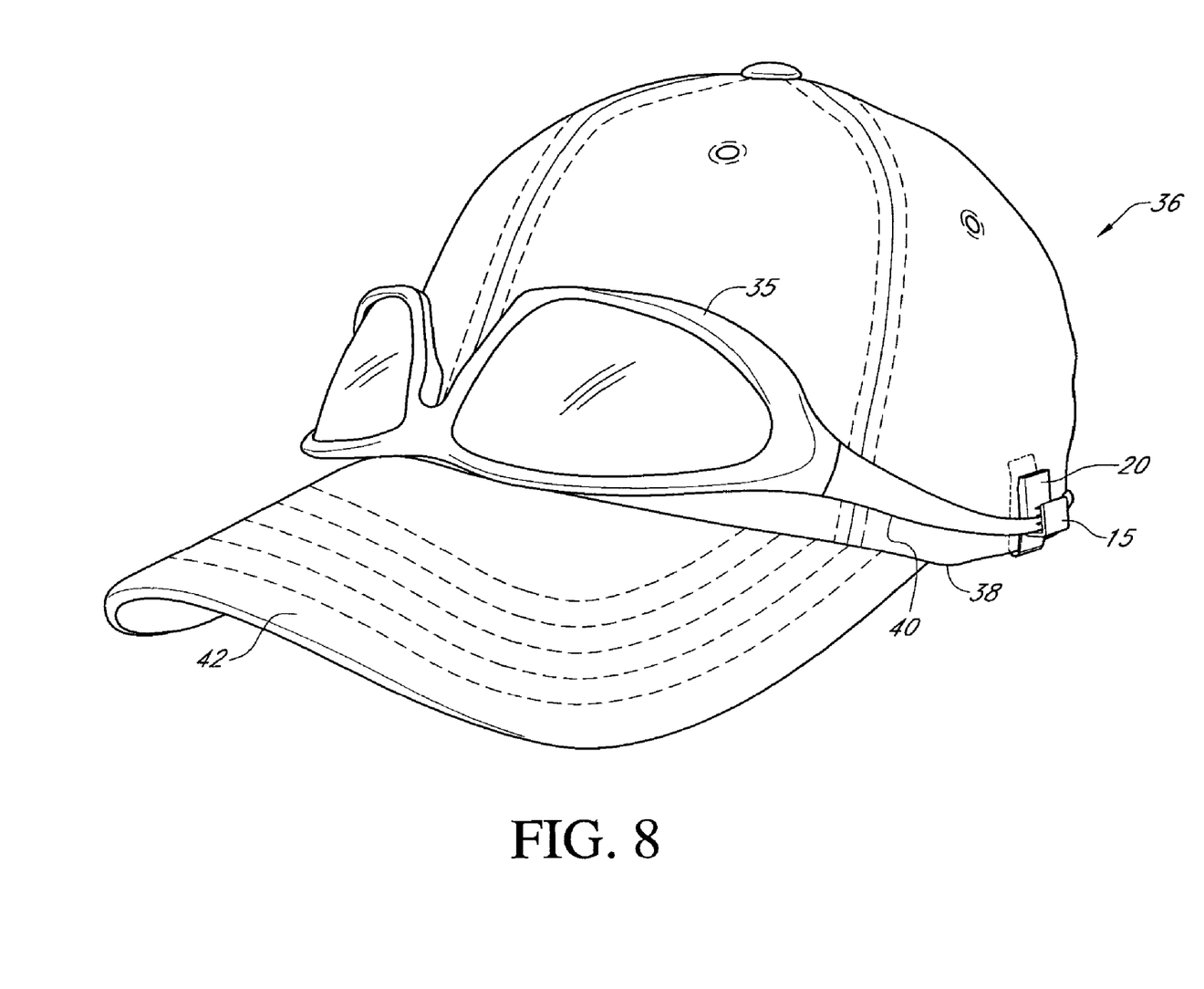
FIG. 8 is a front perspective view of a hat with the eyeglass holder of FIGS. 1 to 5 mounted on one side of the hat and gripping the arm of a pair of glasses supported on the hat.
Figure 9:
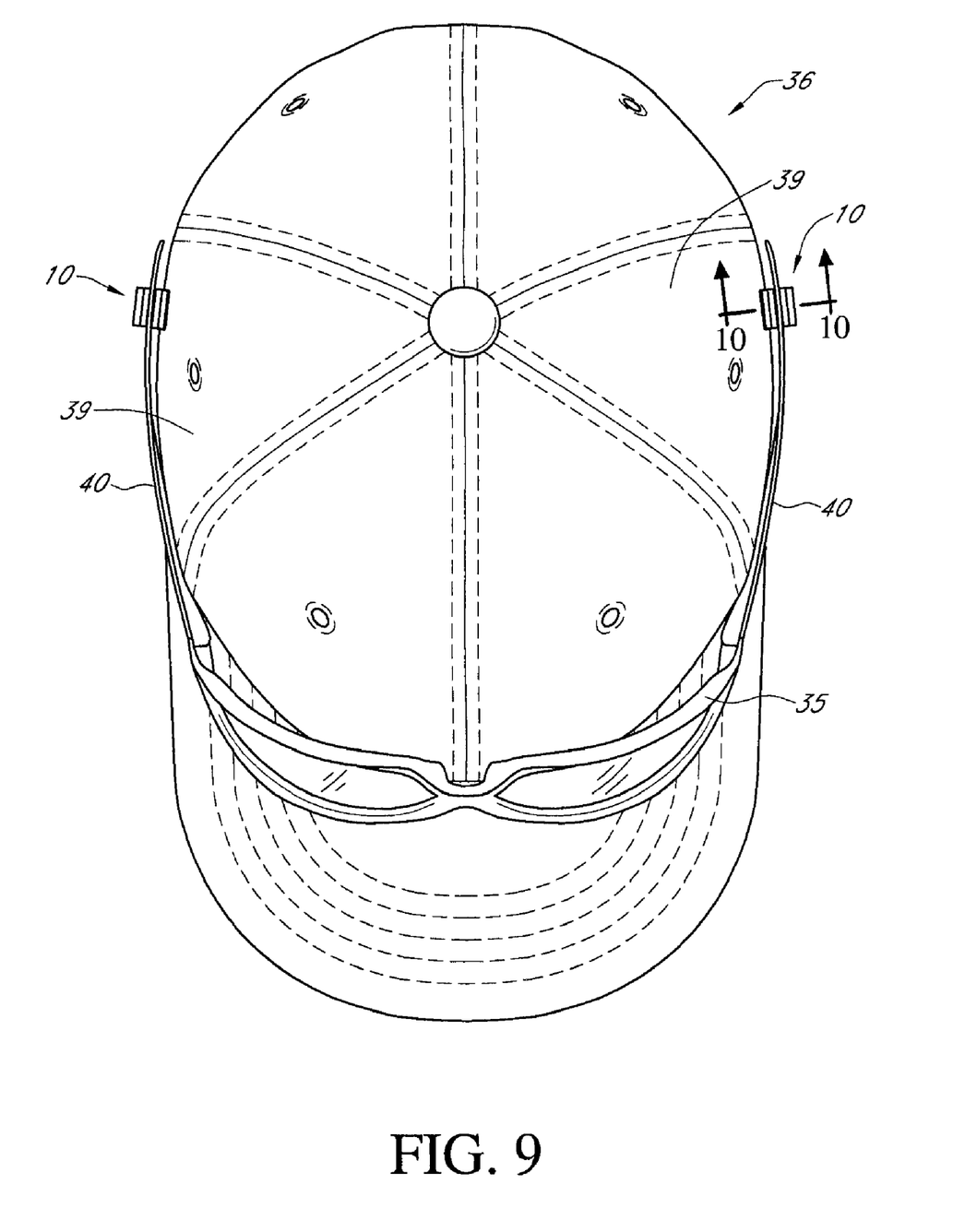
FIG. 9 is a top plan view of the hat of FIG. 8 illustrating the position of an eyeglass holder on each side of the hat holding the respective ear stems of an inverted pair of eyeglasses.
Figure 10:
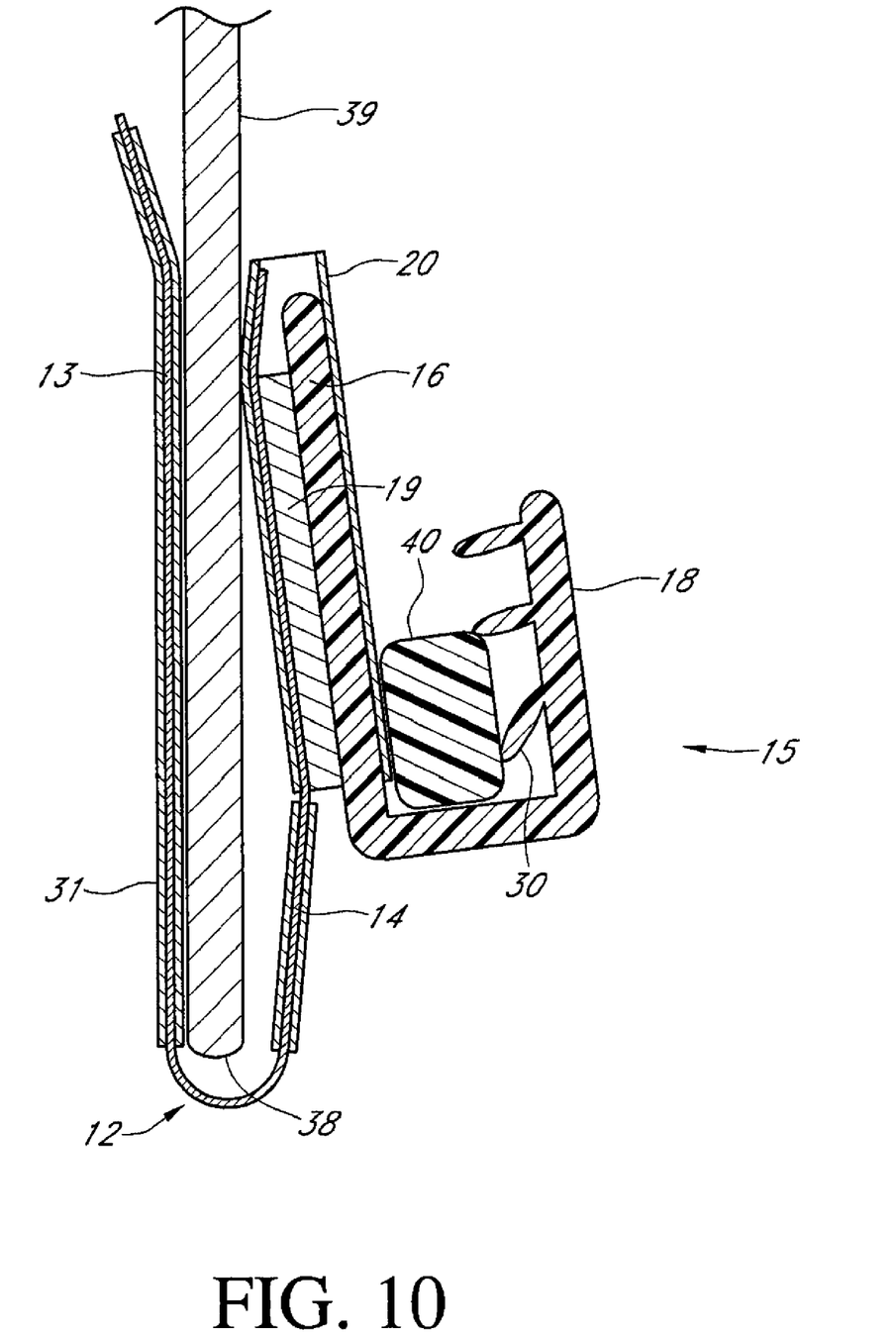
FIG. 10 is a cross-sectional view on the lines 10-10 of FIG. 9 on an enlarged scale.

FIGS. 8 to 11 illustrate the use of eyeglass holders 10 or 34 to retain a pair of glasses 35, such as sunglasses or prescription eyeglasses, in an inverted orientation on a hat or other headwear. FIG. 12 illustrates the use of eyeglass holders 10 installed in a similar fashion on opposite sides of the strap 50 of a visor 55, and holding glasses 35 in an inverted orientation. In FIGS. 8 to 11, two eyeglass holders 10 are clipped over opposite sides of a hat 36, which may be a baseball cap style of hat or any other hat with a lower rim 38 over which the first clip 12 of each holder can be engaged, with the longer leg 13 on the inside of the hat. The hat 36 is a baseball cap in the illustrated embodiment, and has a forwardly projecting bill 42. In FIGS. 8 to 11, the first part or clip 12 of eyeglass holder 10 is engaged over the lower rim of one side portion 39 of the hat with the gripper 15 and outer leg 14 of the spring clip 12 positioned on the outside of the hat, as best illustrated in FIGS. 8 and 10. A second holder 10 is then engaged over the lower rim of the opposite side portion 39 of the hat in a similar manner, as best seen in FIG. 9. The glasses are then placed over the hat in an inverted orientation, with the opposite arms or ear stems 40 pushed into the respective retainers 15. As the ear stems push down, the teeth or fins are deformed downwards, and then one or more fins spring back out over the top of the respective ear stems (depending on the ear stem height) to releasably hold them in position, as illustrated in FIG. 10. By providing three spaced retaining fins or teeth, the retainer is adaptable for engagement with ear stems of different heights. A narrower ear stem pushed down to the lower end of the U-shaped cavity formed by retainer 15 is engaged by the lowermost fin 30, while a relatively tall or wide ear stem may be engaged only by the uppermost fin 30. When the opposite ear stems are engaged in the respective grippers or retainers 15 on a baseball cap or other hat with a bill, the upper brow portion of the glasses rests on the bill 42 (see FIGS. 8 and 11). This arrangement allows the wearer to easily retrieve the glasses by gripping both arms 40, lifting the arms up and out of the holders 10, then rotating the glasses back into an upright orientation before placing them over their eyes with the arms 40 engaged behind their ears.

Figure 11:
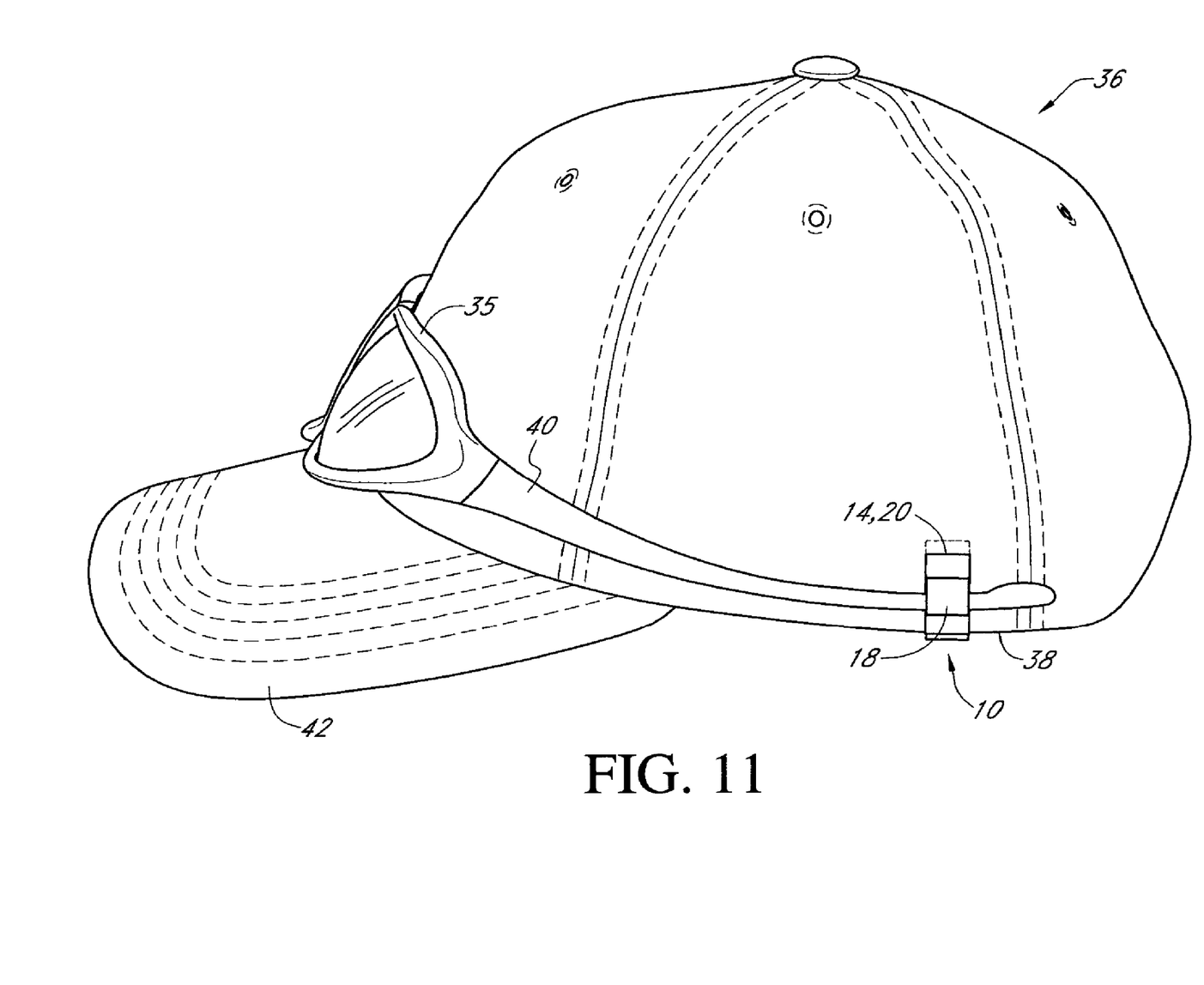
FIG. 11 is a side perspective view of the hat and eyeglass holder arrangement of FIGS. 8 to 10.
Figure 12:
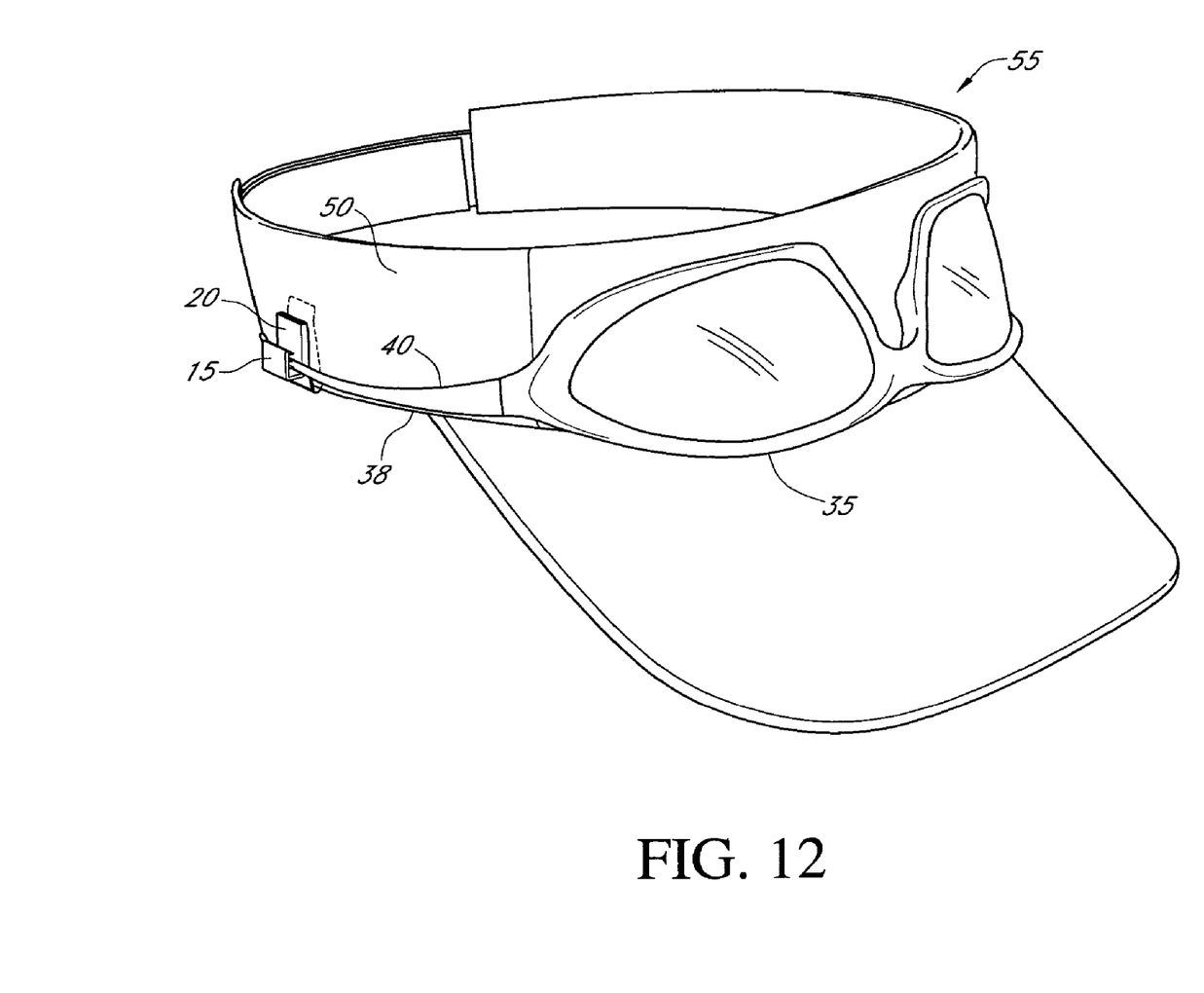
FIG. 12 is a front perspective view illustrating two eyeglass holders secured to opposite sides of a visor and supporting an inverted pair of eyeglasses.

Because the glasses are supported in an inverted orientation, with the flatter or straighter upper edges of the glasses and arms or eyeglass stems 40 facing downward, the eyeglass holders 10 or 32 can be made relatively short, with the grippers 15 extending only a short distance up the opposite side portions of a hat or visor, as illustrated in FIGS. 8 and 11. As can be seen, the holders extend considerably less than half way up the sides of a typical baseball cap, and are compact and unobtrusive so they can be left in place even when not in use. The compact size of the holders 10 and 34 also allows them to be used with visors which may have relatively narrow straps, as illustrated in FIG. 12, in addition to various types of hats or skull caps. The holders 10, 34 are easy to attach to a hat or visor, since the tapered lead in edges 24, 26 of the spring clips help to locate the side edge portions of the hat between the legs of the spring clip 12 or 32. The spring clips are readily adaptable for engagement with hat or visor side edge portions of different materials and thicknesses, and grip the material as indicated in FIG. 10 when installed. This arrangement allows the wearer to readily store their glasses in an easily accessible position when not in use, and to retrieve and re-don the glasses when needed.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. An eyeglass holder for securing eyeglasses to a user's headwear, comprising:
    a spring clip having an inner leg, an outer leg, a closed lower end, and an open upper end configured to engage over a lower rim of headwear with the inner leg inside the headwear and the outer leg outside the headwear with a portion of the headwear gripped between the inner and outer legs;
    a retainer projecting from the outer leg of the spring clip which is configured to engage and releasably retain the arm of a pair of glasses with the glasses in an inverted orientation; and
    the retainer having an outer leg spaced from the outer leg of the spring clip and defining a generally U-shaped cavity for receiving an arm of a pair of glasses, the outer leg having an inner surface and at least one resilient fin extending transversely across the inner surface and projecting inwardly from the inner surface towards the clip, the fin being more resilient than the outer leg of the retainer and being configured to releasably retain an eyeglass arm in the cavity.

2. The eyeglass holder of claim 1, wherein the U-shaped cavity has a lower end and the fin is angled downwards towards a lower end of the cavity.

3. The eyeglass holder of claim 1, wherein at least two fins extend inwardly from the inner surface of the outer leg of the retainer at spaced distances from the lower end of the cavity.

4. The eyeglass holder of claim 3, wherein three spaced fins extend inwardly from the outer leg of the retainer towards the clip.

5. The eyeglass holder of claim 1, wherein the inner leg of the clip is longer than the outer leg.

6. The eyeglass holder of claim 1, wherein the outer leg of the clip is longer than the outer leg of the retainer and the outer leg of the retainer has an upper end spaced below an upper end of the outer leg of the clip.

7. The eyeglass holder of claim 1, wherein the outer leg of the clip has an upper end, and the retainer has a lower end closer to the lower end of the spring clip than the upper end of the outer leg of the spring clip.

8. The eyeglass holder of claim 1, wherein the spring clip and retainer are formed integrally in one piece.

9. The eyeglass holder of claim 1, wherein the spring clip and retainer are formed in two separate parts and the retainer has an inner leg secured to the outer leg of the spring clip.

10. The eyeglass holder of claim 9, further comprising a pliable sleeve engaged over the inner leg of the retainer and outer leg of the clip.

11. The eyeglass holder of claim 10, further comprising a second pliable sleeve engaged over the inner leg of the clip.

12. The eyeglass holder of claim 1, wherein the inner leg of the clip is substantially flat along a major portion of its length, and the outer leg is angled inwardly along at least part of its length towards the flat portion of the inner leg, and then angled outwardly to the end of the inner leg, whereby a reduced width throat portion is formed which is configured to grip opposing surfaces of the headwear.

13. The eyeglass holder of claim 12, wherein the clip is of metal and the width of the throat portion is about ⅛ inch.

14. The eyeglass holder of claim 12, wherein the clip is of plastic and opposing portions of the inner and outer legs of the clip are in contact at the throat portion when the clip is not engaged over headwear.

15. The eyeglass holder of claim 12, wherein the inner leg has an angled portion extending from the flat portion to the end of the inner leg.

16. The eyeglass holder of claim 15, wherein the angled portion is angled outwardly away from the outer leg up to the end of the inner leg.

17. The eyeglass holder of claim 15, wherein the angled portion is angled inwardly towards the outer leg up to the end of the inner leg.

18. An assembly for securing eyeglasses to a wearer's head, comprising:

a headwear member configured to engage over a wearer's head, the headwear member having an inner surface, an outer surface, opposite first and second side portions configured to engage opposite sides of a wearer's head, and a lower rim;

first and second eyeglass holders, the first eyeglass holder engaged over the lower rim of the first side portion and the second eyeglass holder engaged over the lower rim of the second side portion;

each eyeglass holder comprising a spring clip having inner and outer legs, a lower, closed end and an upper, open end which is engaged over the lower rim of a respective side portion of the headwear with the inner leg on the inside of the headwear, and a retainer secured to the outer leg of the clip, the retainer having an outer leg spaced from the outer leg of the clip, the retainer forming an upwardly facing, generally U-shaped cavity with a closed lower end and an open upper end for receiving a respective arm of a pair of glasses in an inverted orientation, the closed lower end of the retainer being closer to the lower end of the clip than the upper end, whereby the arms of a pair of glasses engaged in the respective U-shaped cavity are held closer to the lower rim of the headwear than the open upper end of the clip; and each retainer having at least one resilient fin extending inwardly into the cavity from the outer leg of the respective retainer and configured to releasably retain an eyeglass arm in the cavity.

19. The assembly of claim 18, wherein at least one leg of each clip is inclined inwardly towards the other leg and then bent outwardly adjacent the open end to form a flared inlet opening for the lower rim of the headwear and a reduced width throat portion spaced from the inlet opening, opposing portions of the clip legs gripping the respective side portion of the headwear at the throat portion of the clip.

20. The assembly of claim 18, further comprising a plurality of resilient fins at spaced heights in the cavity configured to retain eyeglass arms of different heights in the cavity.

21. A method of retaining a pair of eyeglasses on a headwear member engaged on the head of a wearer, comprising:

releasably engaging spring clips of first and second eyeglass ear stem holders over the lower rims of opposing side portions of a headwear member to locate upwardly facing eyeglass arm retainers of the holders outside the headwear member adjacent the respective opposite side portions;

positioning a pair of eyeglasses in an inverted orientation over the headwear with the eyeglass lenses above the front of the headwear, a first ear stem over an open upper end of a cavity in a first retainer on one side portion of the headwear and a second ear stem over an open upper end of cavity in a second retainer on an opposite side portion of the headwear; and urging the ear stems downwardly into the respective retainers with the eyeglasses in the inverted orientation until upper edges of the first and second ear stems which face upwardly when the eyeglasses are worn engage lower closed ends of respective cavities of the first and second retainers and at least one resilient fin in each cavity engages over the respective ear stem to releasably retain the ear stem in the cavity.

* * * * *